United States Patent [19]

Schwartz

[11] Patent Number: 4,906,076
[45] Date of Patent: Mar. 6, 1990

[54] HAND-HELD COLLAPSIBLE MAGNIFYING LENS

[76] Inventor: Boris Schwartz, 625 Lafayette Ave., Hawthorne, N.J. 07506

[21] Appl. No.: 350,410

[22] Filed: May 11, 1989

[51] Int. Cl.⁴ .................... G02B 27/02; G02B 7/04; G02B 3/08
[52] U.S. Cl. .................................. 350/409; 350/452
[58] Field of Search .................. 350/409, 451, 452

[56] References Cited

U.S. PATENT DOCUMENTS 4,457,585 7/1984 DuCorday ..................... 350/452

Primary Examiner—Bruce Y. Arnold
Assistant Examiner—Rebecca D. Gass
Attorney, Agent, or Firm—Patrick J. Pinto

[57] ABSTRACT

A hand-held collapsible magnifying lens assembly comprising a plurality of elongated flat magnifying lens segments. Each of the segments is mounted on a common pivot for arcuate rotation. A connecting means is provided for limiting the arcuate rotation of each of the segments. Each of the segments being contoured to provide a more or less continuous viewing area absent overlaping of the segments when the lens assembly is brough to an expanded configuration. This lens assembly may be provided with an aligning means for bringing the segments into a more or less straight alignment.

17 Claims, 2 Drawing Sheets

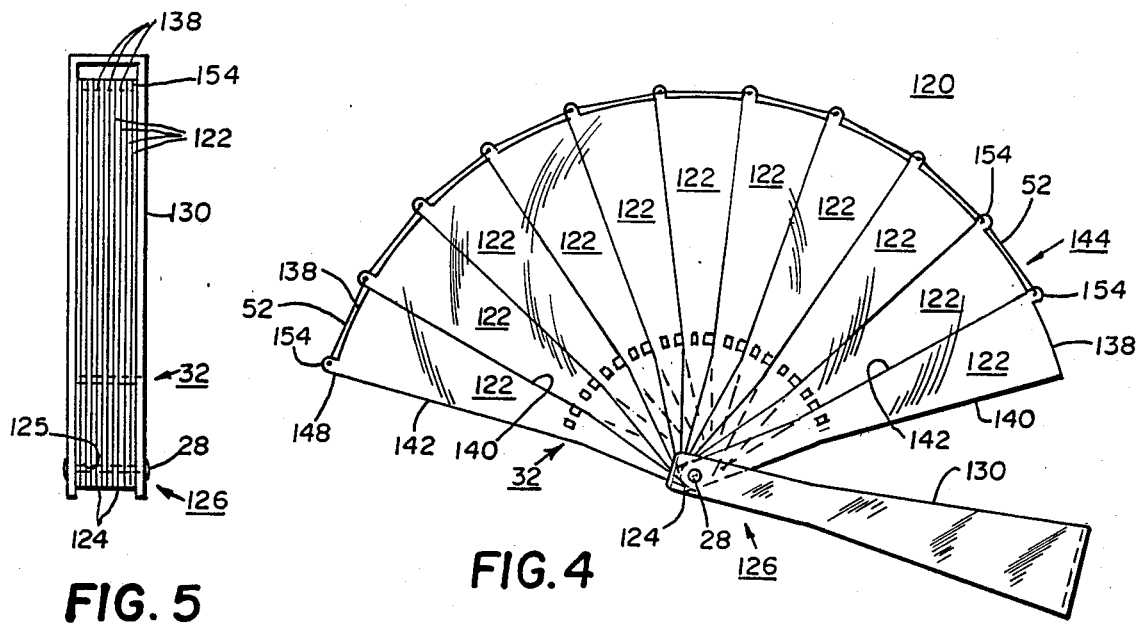
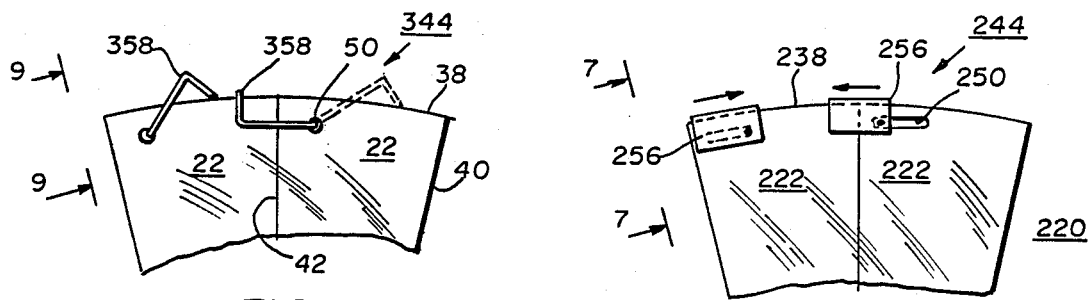
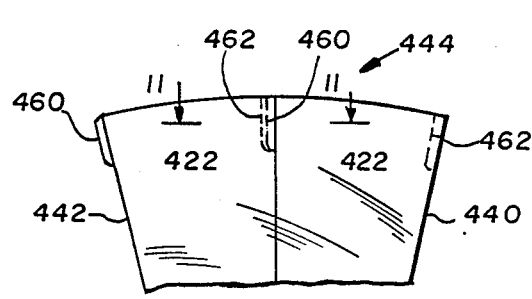
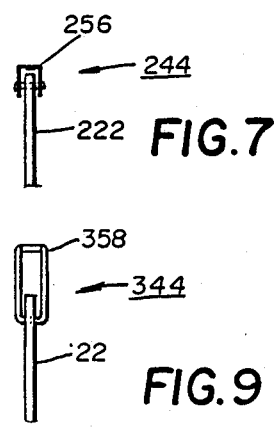
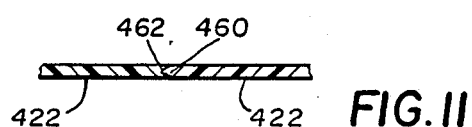

HAND-HELD COLLAPSIBLE MAGNIFYING LENS

BACKGROUND OF THE INVENTION

FIELD OF THE INVENTION

With respect to the classification of art as established in and by the United States Patent and Trademark Office, this invention is believed to be found in the general class entitled as "Optics" and more particularly "Collapsible magnifying lenses."

Many individuals require visual aids to help in the reading of documents containing small print. Magnifying lenses have been well known for this purpose. Conventional magnifying lenses are made of glass generally meaning that they are heavy and bulky. Pocket sized magnifying lenses are limiting as to their field of view. There is a need to provide a compact magnifying lens system which can easily be carried in a pocket, purse, or briefcase while providing the user with a tool for viewing a relatively large area.

It is therefore an object of this invention to provide and it does provide a magnifying lens which can be collapsed for easy carrying in a pocket, purse, briefcase or the like.

It is another object of this invention to provide and it does provide a collapsible magnifying lens system which is light-weight and inexpensive.

It is still another object of this invention to provide and it does provide a magnifying lens system which can be expanded or collapsed as needed.

It is still a further object of this invention to provide and it does provide a collapsible magnifying lens system which is self-storing in a protective handle.

It is yet another object of this invention to provide and it does provide a collapsible magnifying lens system which has a lens aligning means when and as expanded.

This present invention provides a segmented magnifying lens assembly which is lightweight, compact, economical and versatile. This lens system may either be collapsed for carrying in a pocket, purse, briefcase and the like or expanded for reading or viewing large areas.

In addition to the above summary, the following disclosure is detailed to insure adequacy and aid in the understanding of this invention. This disclosure, however is not intended to cover each new inventive concept no matter how it may later be disguised either by variations in form or additions by further improvements. For this reason, there has been chosen specific embodiments of a hand-held collapsible magnifying lens. This magnifying lens system can be collapsed after use and then easily carried in a pocket, purse, briefcase or the like. These specific embodiments have been chosen for the purpose of illustration and description as shown in the accompanying drawings wherein:

BRIEF DESCRIPTION OF THE DRAWING

FIG. 4 represents a front elevational view of an alternate embodiment of a collapsible magnifying lens system, in reduced scale, and particularly showing a self-storing handle means and a segment aligning means.

FIG. 5 represents a side elevational view of the alternate embodiment of FIG. 4, and showing the segments in a stored and protected condition inside the handle.

FIG. 6 represents a fragmentary view in an enlarged scale and showing a third alternate aligning means;

FIG. 7 represents a side elevation of the third alternate aligning means, this view taken along line 7—7 of FIG. 6;

FIG. 8 represents a fragmentary view of a fourth alternate for an aligning means, this view shown in an enlarged scale;

FIG. 9 represents a side elevational view of the fourth alternate aligning means, this view taken along line 9—9 of FIG. 8;

FIG. 10 represents a fragmentary view of a fifth alternate for an aligning means, this view in an enlarged scale;

FIG. 11 represents a top sectional view of the fifth alternate aligning means, this view taken along line 11—11 of FIG. 10.

In the following description and in the claims, various details are identified by specific names for convenience. These names are intended to be generic in their application. Corresponding reference characters refer to like members throughout the several figures of the drawings.

The drawings accompanying, and forming a part of this specification disclose certain details of construction for a hand-held collapsible magnifying lens. These details are for the purpose of explanation, but structural details may be modified without departure from the concept and the principles of the invention. It is anticipated that this invention may be incorporated in structural forms other than as shown.

Figure 1:
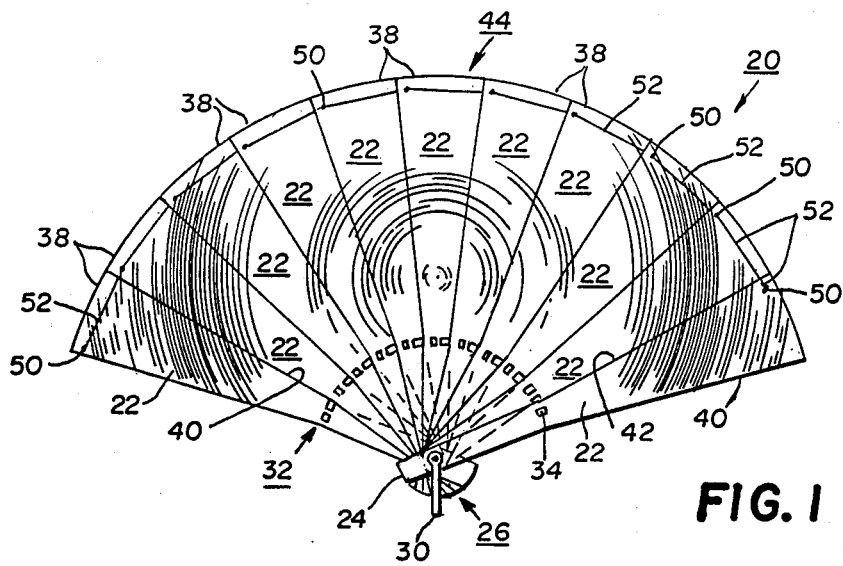
FIG. 1 represents a front elevation view of a magnifying lens system, in a reduced scale, which is shown expanded for the viewing of objects.
Figure 2:
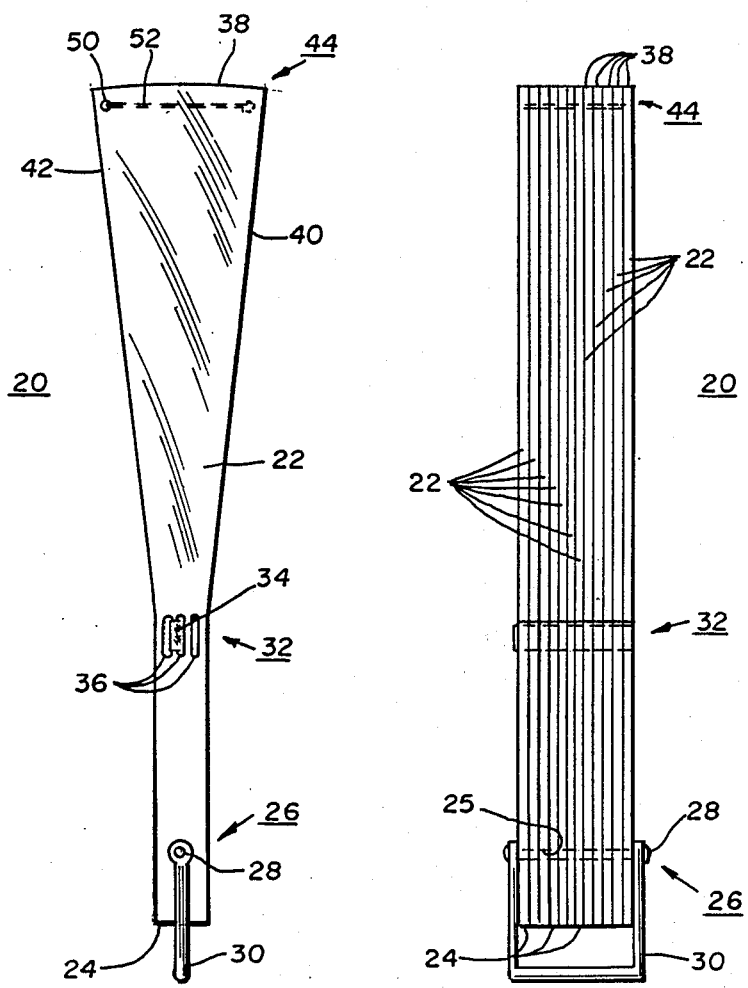
FIG. 2 represents a front elevation view, in full scale, of the magnifying lens system in a collapsed condition for carrying.
Figure 3:
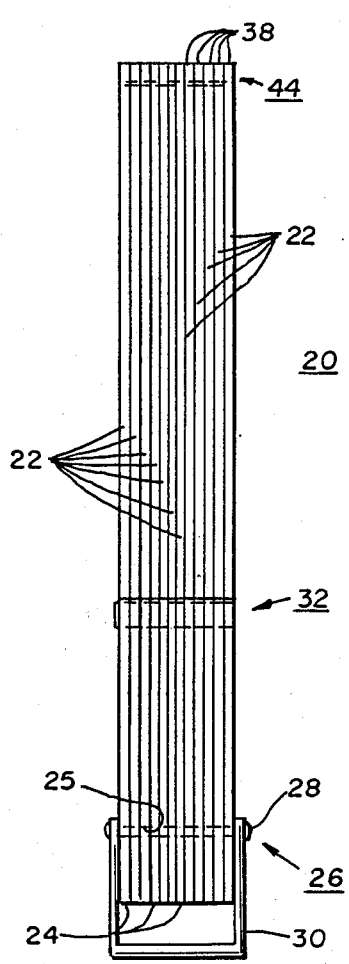
FIG. 3 represents a side elevational view, in full scale, of the magnifying lens system and showing the arrangement of the segments when in a collapsed condition.

DETAILED DESCRIPTION OF FIGS. 1, 2, and 3

Referring to the drawing and in particular to FIG. 1, there is shown a hand-held magnifying lens assembly generally identified as 20. This lens assembly 20 is shown in an expanded fan-like configuration. This magnifying lens assembly is comprised of a plurality of elongated flat lens segments 22. Each of these segments 22 has a first end 24. Referring to FIG. 3, the first end 24 is provided with a through aperture 25 for the connection of a joint means 26. The lens segments are arrayed in juxtapost position with the all the apertures 25 in alignment. A pin member 28 passes through all of the segments 22 and is retained by a clevis 30. Referring to FIG. 1 and FIG. 2, a connecting means generally identified as 32 is provided at a convenient point interior of the first end 24. This connection means 32 is usually made of a flexible material 34 such as fabric ribbon, multi-stranded string, thin plastic strip or the like. This flexible material 34 is fastened to a first of the segments 22 and a last of the segments 22 by means of a plurality of like apertures 36. The flexible material 34 is selectively woven through each of the apertures 36 in each of the segment members 22. The weaving of the flexible material 34 provides a locating means for each segment member 22 while simultaneously limiting the arcuate rotation of the first of the segments 22 relative to the last of the segments 22 or vice-versa. The connecting means 32 ensures that each segment opens to a desired position, with each segment 22 positioned adjacent the next segment in the sequence. The length of the connecting means preferrably limits the arcuate rotation of each of the segments 22 to the extent that there is little or no space between the segments 22 in the viewing area.

Referring in particular to FIG. 2, there is shown a first of the segments 22. This first segment is typical of each of the other segments regarding its shape or contour. Each of the segments 22 has a first end 24. A second end 38 distal from the first end 24. A first side 40 of the segment 22 is contoured. This contour is selected to allow each of the segments 22 to fit adjacent the next segment without any overlap in the viewing area. The viewing area is considered between the connecting means 32 and the second end 38. A second side 42 of the segment 22 is contoured similarly to side 40. It has been found that segment 22 may have a symmetrical contour about a longitudinal centerline.

Referring in particular to FIG. 1 and FIG. 2, an aligning means, generally identified as 44, is provided to connect all of the second ends 38 of the segments 22. This first embodiment of an aligning means comprises a flexible tension member 52 which is fastened at each of its ends to a first of the segments 22 and a last of the segments 22 by way of aperture 50. This flexible tension member 52 is selectively threaded through aperture 50 of each of the intermediate segments 22 to allow the collapsing of the lens system 20. The length of the aligning means 44 is selected to allow the full arcuate opening of the lens system while providing the desired degree of alignment of the segments. It is to be noted that this alignment means is only needed or desired when the elongated segments are made of a thin plastic material ranging from 0.4 mm. (0.15 in.) to 1.0 mm. (0.40 in.). It is anticipated that segments 22 having a thickness greater that 1.0 mm. may not require this aligning means.

Referring to FIG. 3, which shows the relationship of all the segments 22 when the lens system 20 is in a collapsed condition. Each of the segments 22 is pivotly retained in a juxtapost alignment by joint means 26. This joint means is shown as having a clevis member 30 engaging the exterior surfaces of the first and the last of the segments 22. A pin member 28 passes through each of the segments 22 and through apertures provided in the clevis. This pin may be a rivet or other suitable type pin.

DETAILED DESCRIPTION OF FIG. 4 AND FIG. 5

Referring in particular to FIG. 4, there is shown a lens assembly, generally identified as 120. This lens assembly 120 is similar in construction to lens assembly 20. Each of the elongated lens segments 122 has a first end 124. An aperture 125 is selectively positioned at or near the first end 124. A joint means 126 is shown comprising an elongated clevis member 130, which is selectively sized to provide a convenient handle when the lens system is expanded. This clevis 130 also provides a convenient storage means for the lens system when collapsed. A pin member 28 is also shown as part of the joint means, this pin has been previously described above.

A connecting means 32 is provided to control the arcuate rotation of each of the segments. This connecting means 32 has been previously described above. A second end 138 of the segment 122 is distal said first end 124. Each of the segments 122 has a contoured first side 140 and a contoured second side 142. Each of these sides 140 and 142 is selectively contoured to allow each of the segments to be arrayed without an overlap of the segments in the magnified viewing area between the second end 138 and the connecting means 32.

An aligning means 144 is provided to align and guide the second ends 138 of the segments 122. This aligning means 144 is comprised of an eyelet 154 formed at a second corner 148 of segment 122. A flexible tensioning means 52 is fastened to a first and a last of the elongated segments 122. This flexible tension member 152 is selectively and sequentially threaded through each eylete 154 of the intermediate segments 122. The length of the tension member 52 is selected to provide a substantially straight line arrangement of the segments when and as the lens assembly is expanded to an full open configuration.

Referring in particular to FIG. 5., there is shown a side view of the fan assembly of FIG. 4. This view particularly showing the relative juxtapost position of the segments 122 when and in a collapsed condition. Also shown is the protective arrangement of the joint means 126 by allowing the segments 122 to reside interior of the clevis 130 during the collapsed condition.

DESCRIPTION OF FIG. 6 AND FIG. 7

Referring to FIG. 6 and FIG. 7, there is particularly shown a third alternate of an aligning means, generally identified as 244. This aligning means 244 comprises a U-shaped clip member 256 slidingly engaged on each segment member 222. As shown the clip 256 is engaged in an elongated through hole 250, which is located at or near the second end 238 of each segment 222. The clip may have a bent tab, pin, or other suitable means to engage the hole 250.

The individual using the lens system 220 would manually slide the clip 256 to the left (as indicated by an arrow), when the segments 122 are fully expanded without an overlap. It is necessary to provide one clip for each segment with the exception of the last segment. When the user wishes to collapse the lens assembly, it is necessary to manually slide each clip 256 to the right (as indicated by an arrow) thereby allowing the adjacent segment to pass the segment upon which the clip is mounted. It is anticipated that the clip should be small in size in order to minimize the area of the lens that would be blocked from viewing.

DESCRIPTION OF FIG. 8 AND FIG. 9

Referring to FIG. 8 and FIG. 9, there is depicted a fourth aligning means 344 which comprises a L-shaped link 358 pivotly mounted in hole 50 of elongated segment 22. This link 358 is anticipated as being a formed or bent wire, similar in characteristics to a conventional paper clip. It is necessary for the user to manually rotate link 358 counter clock-wise to engage an adjacent and fully expanded lens segment 22. A link 358 would be provided for each segment 22 except for the last of the segments, i.e., if 12 segments were used then 11 links would be required. This aligning means 344 is used to maintain a substantially straight line arrangement of the second end 38 of the segments when expanded. As previously noted this alignment means is only needed when relatively thin lens segments, less than 1.0 mm., are utilized. When and if the lens assembly is to be collapsed, each of the links 358 must be manually rotated clock-wise to allow each segment to slide past the next segment.

DESCRIPTION OF FIG. 10 AND FIG. 11

Referring to FIG. 10 and FIG. 11, there is shown a fifth aligning means 444. This aligning means comprises a male lug 460 formed on a contoured second side 442 of a segment 422. This lug 460 is adapted to mate with a recess 462 formed in the first contoured side 440 of an adjacent segment 422. This aligning means 444 would keep all the segments in substantially straight-line alignment during expanded arrangement of the lens assembly. After expansion of the lens system, the aligning means 444 is manually engaged. The connecting means 32, not shown but previously described, maintains the engagement of the aligning means 444 until no longer needed. An individual would then be required to separate the aligning means 444 prior to collapsing the lens system for storage.

USE AND OPERATION

Actual use of the hand-held collapsible magnifying lens assembly herein previously described in the various figures of the drawing is quite simple. The magnifying lens assembly would be expanded, as seen in FIG. 1 and FIG. 4, when an individual desires to read relatively large areas of printed matter, such as a paragraph on a page. The lens assembly as shown depicts a fan-shaped arrangement having a more or less radial design. It is anticipated that other configurations many be used by selectively shaping the individual segment members. The size and shape of the viewing area is determined by the length and contour of each segment member. Therefore a more or less rectangular viewing area may be attained. The invention as shown provides the most compact of the various designs possible.

The elongated lens segments 22, 122, 222, and 422 are shown as being Fresnel Lens type, although other thin type of magnifying lens members may be employed. It is also contemplated that the segment members first be molded in a sheet form, then die cut to a preferred contour in a subsequent operation. It is also desireable that each of the individual segments have an individual identifying character provided thereon. This identifying character would aid during assembly of the segments, by providing a means for sequentially arranging the segment members. This sequential arrangement of the segment members will provide a more or less continuous alignment of the radial grooves of a Fresnel Lens, when the lens system is expanded as shown in FIG. 1 and FIG. 4. Of course each of the segments may be individually molded of a plastic material to provide all the necessary holes, contours, and identifying characters with the minimal use of plastic molding material. It is quite evident that segment 422 would require individual molding of each of the segments in order to produce the lug 460 and the recess 462.

It is anticipated that the segments members have a thickness in the range of 0.4 mm. to 2.0 mm. The thickness of the segment members is a matter of design selection, and determined by the desired rigidity, size and weight of the lens assembly. It is expected that a thicker segment member may not require an aligning means.

In its construction and use, the collapsible magnifying lens assembly depicted and described above is believed to provide a basis for a method of such construction and use. This method including the steps of:

providing a plurality of an elongated magnifying lens segment member, each of said segment members having a first end, a second end, a first side and a second side, said segment member having a selectively contoured outline and a fresnel lens magnifying viewing area;

mounting said plurality of segment members on and over a pivot means, said pivot means at or near said first end, said pivot means including a pin and a clevis arrangement, said clevis may be adapted to receive and store said segments when and as collapsed;

arraying said plurality of segment members in juxtapost relationship for arcuate rotation;

engaging each segment members with a connecting means at a point interior of said first end to limit the arcuate rotation of each segment member when unfurled to an expanded configuration.

attaching an aligning means at or near the second end of each segment.

Terms such as "left", "right", "up", "down", "bottom", "top", "front", "back", "in", "out", and the like are applicable to the embodiment shown and described in conjunction with the drawings. These terms are merely for the purpose of description and do not necessarily apply to the position in which the hand-held collapsible magnifying lens of the present invention may be constructed or used.

While this particular embodiment of a Hand-held Collapsible Magnifying Lens has been shown and described, it is to be understood that the invention is not limited thereto and protection is sought to the broadest extent the prior art allows.

What is claimed is:

1. A hand-held collapsible magnifying lens assembly consisting of:
    (a) a plurality of elongated flat magnifying lens segment members, each of said segment members having a first end and a second end;
    (b) a joint means for holding said plurality of the segment members at or near said first end, said joint means for holding said plurality of flat segment members in juxtapost relationship, said plurality of flat segment members being arrayed for arcuate rotation about said joint means and
    (c) a connecting means for sequentially engaging all segment members at a point intermediate said first end and said second end, said connecting means adapted to limit the arcuate rotation of each segment member when unfurled to an expanded condition, said expanded condition providing a substantially continuous lens surface between said connecting means and said second end, said continuous lens for the magnified viewing of objects therethrough.

2. A hand-held magnifying lens assembly as recited in claim 1 wherein each of said segment member further includes having a contoured outline, said contoured outline providing said continuous lens with a single thickness between said connecting means and said second end.

3. A hand-held magnifying lens assembly as recited in claim 2 wherein said joint means further includes:
    (a) a U-shaped clevis member;
    (b) a pin member retentively engaged by and at an open end of said clevis;
    (c) said clevis member adapted for an interior mounting of said plurality of said segment members within.

4. A hand-held magnifying lens assembly as recited in claim 3 wherein said clevis member is further adapted for fully protecting all of said segment members when and as the lens assembly is brought to a collapsed configuration.

5. A hand-held magnifying lens as recited in claim 2 wherein each of said segment members is formed with a fresnel lens viewing surface.

6. A hand-held magnifying lens as recited in claim 5 wherein said flat segment member has a thickness ranging from 0.4 mm. to 2.0 mm.

7. A hand-held magnifying lens as recited in claim 6, said magnifying lens further including at least one aligning means, said aligning means for bringing said plurality of said segment members into a substantially straight alignment configuration when said lens assembly is brought to an expanded condition.

8. A hand-held magnifying lens as recited in claim 7 wherein said aligning means further includes:
   (a) an eyelet member formed at a corner adjacent said second end of the segment member;
   (b) A flexible tie member having a selected length, said flexible tie member being fastened at one end to an eyelet of the first of said segment members, a second end of said tie member being fastened to an eyelet of the last of the segment members, said tie member being selectively and sequentially threaded through all the remaining eyelet members intermediate said first and said last of the segment members.

9. A hand-held magnifying lens as recited in claim 7 wherein said aligning means further includes a plurality of shaped link members, each of said link members pivotly mounted at a first corner of said second end of each segment member, each of said link members being adapted to engage a second corner of an adjacent segment member, said second corner adjacent said second end and distal said first corner.

10. A hand-held magnifying lens as recited in claim 7 wherein said aligning means further includes a plurality of shaped clip members, each clip member adapted for sliding engagement at or near a first corner of said second end of the segment member, said clip member adapted for engaging a second corner of an adjacent segment member as desired, said second corner adjacent said second end of the segment member and distal said first corner.

11. A hand-held magnifying lens as recited in claim 7 wherein said aligning means further includes:
   (a) at least one male lug member formed at or near a first corner of said second end of each segment member;
   (b) a least one recess member formed at or near a second corner of said segment member, said second corner adjacent said second end of the segment member and distal said first corner, said recess member adapted for mating with said lug member of an adjacent segment member when and as said lens assembly is brought to a substantially expanded configuration.

12. A method for making a hand-held collapsible magnifying lens assembly including the following steps of:
   (a) provding a plurality of elongated flat magnifying lens segment members, each of said segment members having a first end, a second end, a first side, and a second side;
   (b) mounting said plurality of said segment members on a pivot means, said pivot means at or near said first end;
   (c) arraying said plurality of said segment members in juxtapost relationship for arcuate rotation;
   (d) engaging each segment member with a connecting means at a point interior of said first end to limit the arcuate rotation of each segment member when unfurled to an expanded configuration.

13. A method for making a magnifying lens as recited in claim 12 including the further steps of forming each segment member with a contoured outline.

14. A method as recited in claim 13 including the further step of providing said segment member with a fresnel lens viewing area.

15. A method as recited in claim 14 including the further step of providing a clevis and pin arrangement as said pivot means.

16. A method as recited in claim 14 including the further steps of:
   (a) providing a pin and an elongated clevis arrangement as said pivot means;
   (b) storing said segment members interior of said clevis member when said segment members are in a collapsed configuration.

17. A method as recited in claim 14 including the further step of providing a least one aligning means at or near said second end.

* * * * *